(12) United States Patent
DiMambro

(10) Patent No.: US 7,689,723 B1
(45) Date of Patent: Mar. 30, 2010

(54) VIRTUAL CLONED DEVICE NODE

(75) Inventor: Francesco DiMambro, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1542 days.

(21) Appl. No.: 10/983,442

(22) Filed: Nov. 8, 2004

(51) Int. Cl.
*G06F 15/16* (2006.01)

(52) U.S. Cl. ................... 709/250; 370/420; 370/539

(58) Field of Classification Search ............. 709/250; 370/463; 703/23–28
See application file for complete search history.

(56) References Cited

U.S. PATENT DOCUMENTS

| | | | | |
|---|---|---|---|---|
| 5,590,285 | A * | 12/1996 | Krause et al. ............... | 709/218 |
| 7,305,014 | B2 * | 12/2007 | Kirk et al. .................. | 370/539 |
| 7,478,173 | B1 * | 1/2009 | Delco ......................... | 709/250 |
| 7,509,436 | B1 * | 3/2009 | Rissmeyer .................. | 709/249 |
| 2006/0004554 | A1 * | 1/2006 | Vega et al. ................... | 703/6 |

* cited by examiner

*Primary Examiner*—Wing F Chan
*Assistant Examiner*—Ruolei Zong
(74) *Attorney, Agent, or Firm*—Park, Vaughan & Fleming LLP

(57) ABSTRACT

A system and method for virtualizing a hardware device node for a network interface circuit or other device. In a clone driver's configuration file, multiple virtual or clone nodes are defined. Their major numbers match the major number of the driver, but a virtual node's minor number for a Style 2 driver is calculated from the hardware driver's major number and the instance or port number of the corresponding hardware node. By creating multiple clone nodes, multiple paths through the protocol stack are created. Each one can be configured differently (e.g., for different MTU sizes), and each may be assigned a different address (e.g., MAC address). The separate addresses may be registered with hardware filters to filter incoming packets at the hardware level. A traffic classifier created in the device driver manages each virtual node's association with a hardware filter.

29 Claims, 4 Drawing Sheets

VIRTUAL CLONED DEVICE NODE

BACKGROUND

This invention relates to the field of computer systems. More particularly, a system and methods are provided for configuring a network interface device to support jumbo frames (or other properties) for selected communication streams, through the use of virtual device nodes.

Jumbo frames are often useful in Ethernet network spaces, to allow greater amounts of data to be conveyed in each packet. However, existing support for jumbo frames is unsatisfactory in many existing computer systems and network interface circuits. In particular, support for jumbo frames cannot be selectively enabled for different communication streams. As a result, the hardware cannot automatically filter out jumbo frames for streams that cannot handle them, and it must pass all such packets to software. The network interface circuit (NIC) and the host computer system therefore become vulnerable to a denial of service attack (i.e., through the flooding of jumbo frames).

More specifically, because of how network interface circuits and their software drivers currently operate, if jumbo frames are enabled at the hardware for one communication stream, they must be enabled for all streams. For example, in a computer system operating a form of the UNIX operating system, device nodes are created for every hardware device and for every hardware device's software driver. Because only one node can typically be created for each Style 2 driver, the configuration of that node is applied for all communication streams through the corresponding hardware device. Thus, for a NIC hosting multiple communication streams, the device node for the NIC's driver will specify, among other things, a default MTU (Maximum Transfer Unit) size to be applied to all streams.

Another result of current methods of supporting jumbo frames is that jumbo frame support may be inadvertently enabled on a network or sub-network only designed to support smaller frames.

Thus, there is a need for an apparatus and a method for configuring a NIC or other network interface device to support jumbo frames, at the device layer, on just specified streams. More generally, there is a need for an apparatus and a method for virtualizing a communication device to allow it to be operated with different operating parameters for different communication streams.

SUMMARY

In one embodiment of the invention, a system and methods are provided for virtualizing a hardware device node for a network interface circuit or other device. In a clone driver's configuration file, multiple virtual or clone nodes are defined. Their major numbers match the major number of the driver, but each virtual node's minor number is generated as a combination of data allowing different virtual nodes to be distinguished from each other. In one implementation for a Style 2 driver, a virtual node's minor number is calculated from a major number of the hardware's device driver and an instance or port number of the hardware node. For a Style 1 driver, an instance number of the hardware device may also be used. By creating multiple clone nodes, multiple paths through the protocol stack are created.

Each virtual node, and therefore its communication streams, can be configured differently (e.g., for different MTU sizes), and each may be assigned a different address (e.g., MAC address). The separate addresses may be registered with hardware filters to filter incoming packets at the hardware level. A traffic classifier created in the device driver manages each virtual node's association with a hardware filter.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, an apparatus and method are provided for configuring a NIC or other network interface device to selectively support jumbo frames (or other property or mode of operation). In this embodiment a single physical hardware device is virtualized, meaning that multiple virtual device nodes are created, rather than just one as in a traditional UNIX operating system environment. Each node can be configured differently (e.g., for different MTU sizes) and different communication streams through the one device can therefore support different maximum packet sizes and/or other properties.

In another embodiment of the invention, each virtual node is associated with a different address, such as a MAC (Medium Access Control) address. Therefore, incoming communication traffic can be filtered by address at the hardware level.

Because virtual node configurations can be enforced at the hardware level, a NIC can drop jumbo frames addressed to a node not configured to receive jumbo frames. This allows the NIC to avoid processing unwanted packets in software, and thereby prevent denial of service attacks via jumbo frame flooding.

Figure 1:
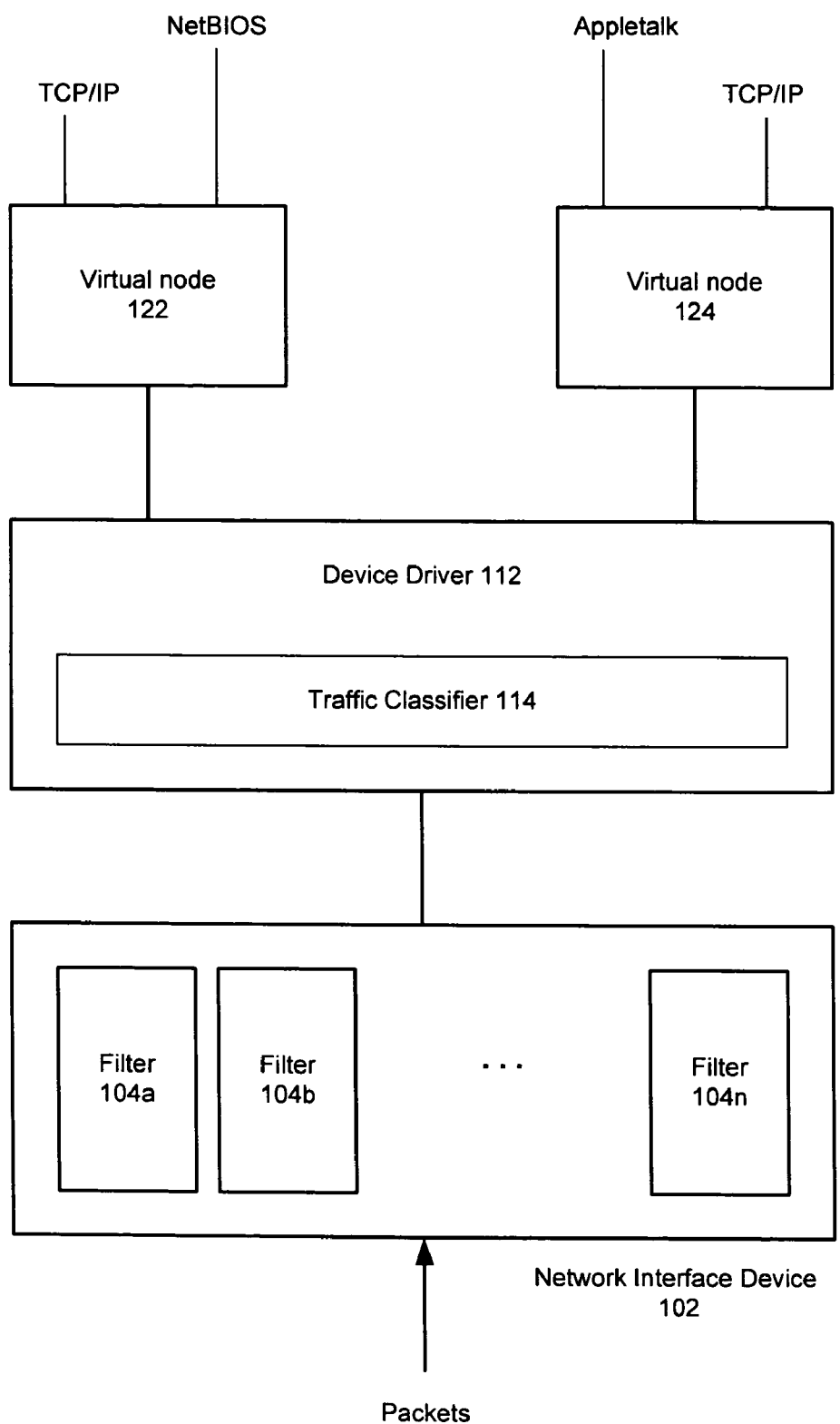
FIG. 1 is a block diagram depicting virtual device nodes for a network interface device, in accordance with an embodiment of the present invention.

FIG. 1 depicts a network interface device and protocol stack configured to support virtual device nodes, according to one embodiment of the invention. Network interface device 102 of FIG. 1 corresponds to a network interface offered by Sun Microsystems, Inc., which operates in a computer system executing the Solaris operating system (or other UNIX-based operating system).

Network interface device 102 receives packets from a network or other communication link and passes accepted packets to device driver 112. The device driver forwards packets to a destination virtual device node. Two virtual nodes, 122 and 124, are depicted in FIG. 1.

Device 102 includes any number of filters 104, which are capable of filtering incoming packets based on properties such as destination address (e.g., MAC address), source address, size, etc. In the illustrated embodiment, a number of filters at least equal to the number of instantiated virtual nodes may be employed. Each filter is configured to filter incoming packets based on the MAC address assigned to the virtual node. For example, filter 104*a* may be configured with the MAC address for virtual port 122, in which case it rejects packets having other destination addresses.

Device driver 112 includes traffic classifier 114, which is configured to forward packets received from network interface device 102 to virtual ports 122, 124 based on the filter 104 that accepted the packets. Illustratively, for a packet forwarded to device driver 112, the network interface device may configure a field in a corresponding receive descriptor to identify (e.g., by index) the filter that accepted the packet. Traffic classifier 114 then determines which virtual node is associated with that filter. In one implementation, the traffic classifier comprises an array for mapping indexes of filters 104 to virtual nodes.

As shown in FIG. 1, each virtual node may maintain communication streams for any number of upper layer protocols (e.g., TCP, IP, Appletalk, NetBIOS, NetBEUI).

Figure 2:
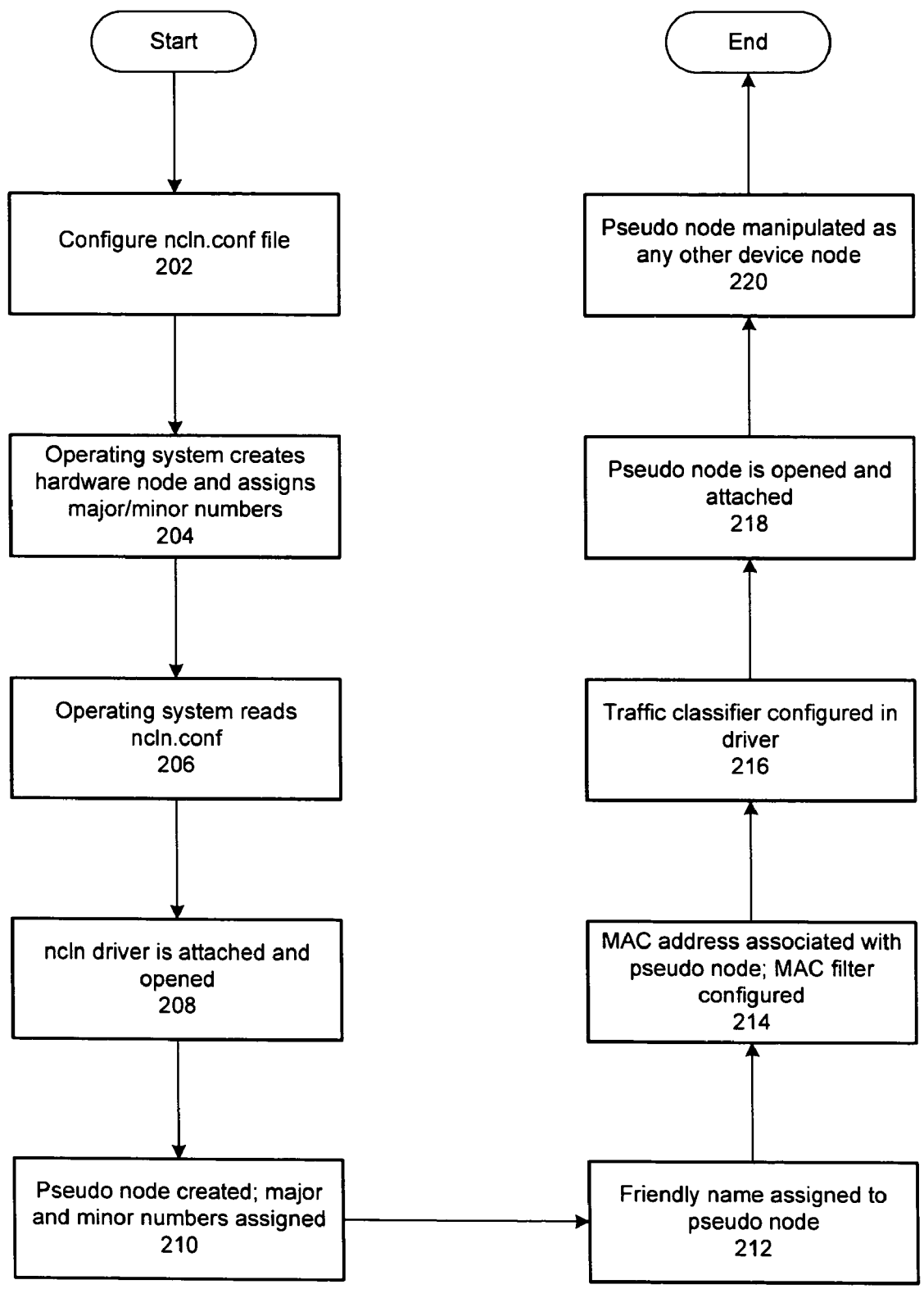
FIG. 2 is a flowchart illustrating one method of implementing virtual device nodes in accordance with an embodiment of the invention.

FIG. 2 demonstrates a method of implementing a virtual device node, according to one embodiment of the invention for a UNIX-based operating system such as Solaris®. This embodiment is compatible with the existing devfs framework, but overcomes limitations of that framework to allow multiple virtual (e.g., clone) device nodes for a single hardware device. In this embodiment, a virtual device node is created for a network interface device; in other embodiments other types of hardware devices may be virtualized.

For each virtual node, a separate path is defined from the device's driver, thereby allowing each virtual node to host communication streams having different operating properties (e.g., MTU size). For example, with multiple virtual nodes, each one may support a different IP (Internet Protocol) subnet.

In the illustrated embodiment of the invention, a hardware device node is created for the network interface device (e.g., /devices/pci@1/network@1) in a normal fashion when the device is installed or identified during system boot. The virtual nodes comprise separate pseudo or clone software nodes that are tied to the hardware device node.

In operation 202, a clone driver's configuration file (e.g., ncln.conf) for constructing the virtual device nodes is configured. As one skilled in the art will recognize, a driver.conf file comprises a set of properties and values to associate with a node. A first virtual device node defined in the ncln.conf file for a first network interface device may include properties such as:

name=ncln
parent=pseudo
instance=0
vport=0
drv_major=256

In this example, the "name" property names the node and identifies the driver for the node (e.g., "ncln" may stand for "new clone"). The "parent" property identifies the node's parent in the device tree (e.g., /devices/pseudo) and the "instance" property identifies the instance number of the ncln node. The "vport" property identifies the virtual port number for the specified hardware device, which is identified by the "drv_major" property. In particular, the "drv_major" property indicates the major number of the driver for the hardware device to which the virtual node will be attached.

Multiple virtual nodes may be defined in a single configuration file. Thus, a first virtual device node for a second, different, network interface device may include properties such as:

name=ncln
parent=pseudo
instance=1
vport=0
drv_major=123

In this example, the "name" and "parent" properties are the same as the previous example. The "instance" property is incremented because it is the second ncln virtual driver node. The "vport" property is zero because this virtual device node is the first node for a different hardware device, whose driver has a major number of 123.

Properties for a third ncln node, if it is to be used with the same hardware device as the first node, may include the following:

name=ncln
parent=pseudo
instance=2
vport=1
drv_major=256

Other properties or parameters may also be specified in the ncln.conf file, such as low water mark, high water mark, MTU, etc.

Illustratively, if driver Style 1 is to be applied to a virtual device node, the node's properties in ncln.conf would also include a "drv_minor" property. This property would identify a specific hardware device instance to associate with the node, which will occur before the device is opened. As one skilled in the art will recognize, in Style 2, a stream is not attached to a device instance until after the device is opened, and so the "drv_minor" property is not required.

In operation 204, when the host computer system is booted, the network interface device is identified and a hardware device node is created as usual (e.g., /devices/pci@1/network@1) and assigned a major number (e.g., 256) and a minor number indicating the instance number of that type of hardware (e.g., 0 for the first instance).

In operation 206, the operating system (e.g., the devfs framework) locates and reads the configuration file established in operation 202 (e.g., ncln.conf).

In operation 208, the operating system loads the ncln driver and performs attach and open operations on the driver. In particular, for each instance of ncln defined in ncln.conf, the ncln driver's ncln_attach and ncln_open routines are invoked. The ncln driver is assigned a unique major number (e.g., 300), either automatically by the operating system, or manually by referring to the name_to_major file. The ncln driver's minor number will match the major number of the network interface device (e.g., 256).

In operation 210, the ncln_attach routine causes virtual (pseudo) nodes to be created for each instance of ncln defined in ncln.conf. Each virtual (pseudo) node is assigned a major number and a minor number. In the illustrated embodiment of the invention, the virtual nodes' major numbers match the major number of the ncln driver (e.g., 300), while their minor numbers are derived from their "vport" properties and the associated hardware driver's major number (and, for Style 1, an identifier of an instance of the hardware).

Thus, an illustrative virtual device node may have the following syntax for Style 2:

/devices/pseudo/ncln@<driver name>:<instance>.<vport>
<ncln major>:<vport * 1000>+<driver major>

Or, for Style 1, a virtual device node may have the following syntax for Style 1:

/devices/pseudo/ncln@<driver name>:<instance>.<vport>.<drv_minor>
<ncln major>:<<vport * 1000>+<driver major>* 1000>+ drv_minor Applying the Style 2 syntax to the first ncln virtual node in the ncln.conf file described above yields:

/devices/pseudo/ncln@XXX:0.0 300:256 where XXX is the name of the network interface device (e.g., ce, hme) having a major number equal to the "drv_major" property specified in ncln.conf.

The second instance of the ncln virtual node might appear in Style 2 as

/devices/pseudo/ncln@YYY:1.0 300:123 as it will be associated with the first virtual port for a different physical hardware device.

The third instance of the ncln virtual node might take the Style 2 form of

/devices/pseudo/ncln@XXX:2.1 300:1256 because it is to be associated with the second virtual port for the same physical hardware device as the first virtual node.

Minor numbers of virtual device nodes may be configured in other ways in other embodiments of the invention.

In operation 212, friendly names are assigned to the virtual device nodes. Illustratively, this occurs automatically when the virtual nodes are created. An initial friendly name for the first ncln virtual node (/devices/pseudo/ncln@XXX:0.0) may be similar to /dev/XXX_v0_p, while friendly names for the second and third ncln virtual nodes may be similar to /dev/YYY_v0_p (instead of /devices/pseudo/ncln@YYY:1.0) and /dev/XXX_v1_p (instead of /devices/pseudo/ncln@XXX:1.0). As described below, in the method depicted in FIG. 2, a physical port number will be appended to the initial friendly names.

In operation 214, each virtual device node is associated with a unique MAC (or other) address. Filters in the network interface device are configured for the virtual nodes. For example, a separate filter may be configured for each virtual node, to accept packets addressed to that node's address.

Filters may also be configured to filter based on other criteria (e.g., size). Illustratively, the configuration file used to configure the virtual device nodes (ncln.conf) may include another property to specify the maximum packet size; for example:

MTU=1518<or>
MTU=9216

In operation 216, a traffic classifier in the device driver (e.g., ncln) is configured. The traffic classifier may be configured to associate different filters in the network interface device with different virtual device nodes. Illustratively, the traffic classifier comprises a data structure (e.g., an array) mapping virtual device nodes to individual filters in the network interface device.

In operation 218, a virtual device node is opened and attached. In one implementation, the open and attach commands for the first virtual node may be similar to the following:

fd=open("/dev/XXX_v0_p");
dlpi_attach(fd, 0);

For the third virtual node (associated with the same hardware device as the first), the open and attach may be:

fd=open("/dev/XXX_v1_p");
dlpi_attach(fd, 0);

The attachment procedure will append the physical port number (e.g., 0, 1) to the ends of the friendly names for the first and third virtual nodes (which are associated with the same hardware device), to produce dev/XXX_v0_p0 and dev/XXX_v1_p0.

For the second virtual node described in the ncln.conf file, the open and attach commands may be similar to:

fd=open("/dev/YYY_v0_p");
dlpi_attach(fd, 0);

and result in a friendly name of dev/YYY_v0_p0).

In operation 220, the virtual device nodes may be used as any other device nodes. For example, the ifconfig routine may be used to connect IP to one or more of the virtual nodes (e.g., "ifconfig XXX_v0_p0 plumb 100.10.1.111 up").

FIG. 2 illustrates just one method of creating and associating one or more virtual (e.g., pseudo or clone) device nodes with a single physical device or instance of a physical device. Each virtual node is usable as a virtual port built upon a single physical port. Other methods may be derived from the illustrated method and the associated descriptions.

Figure 3:
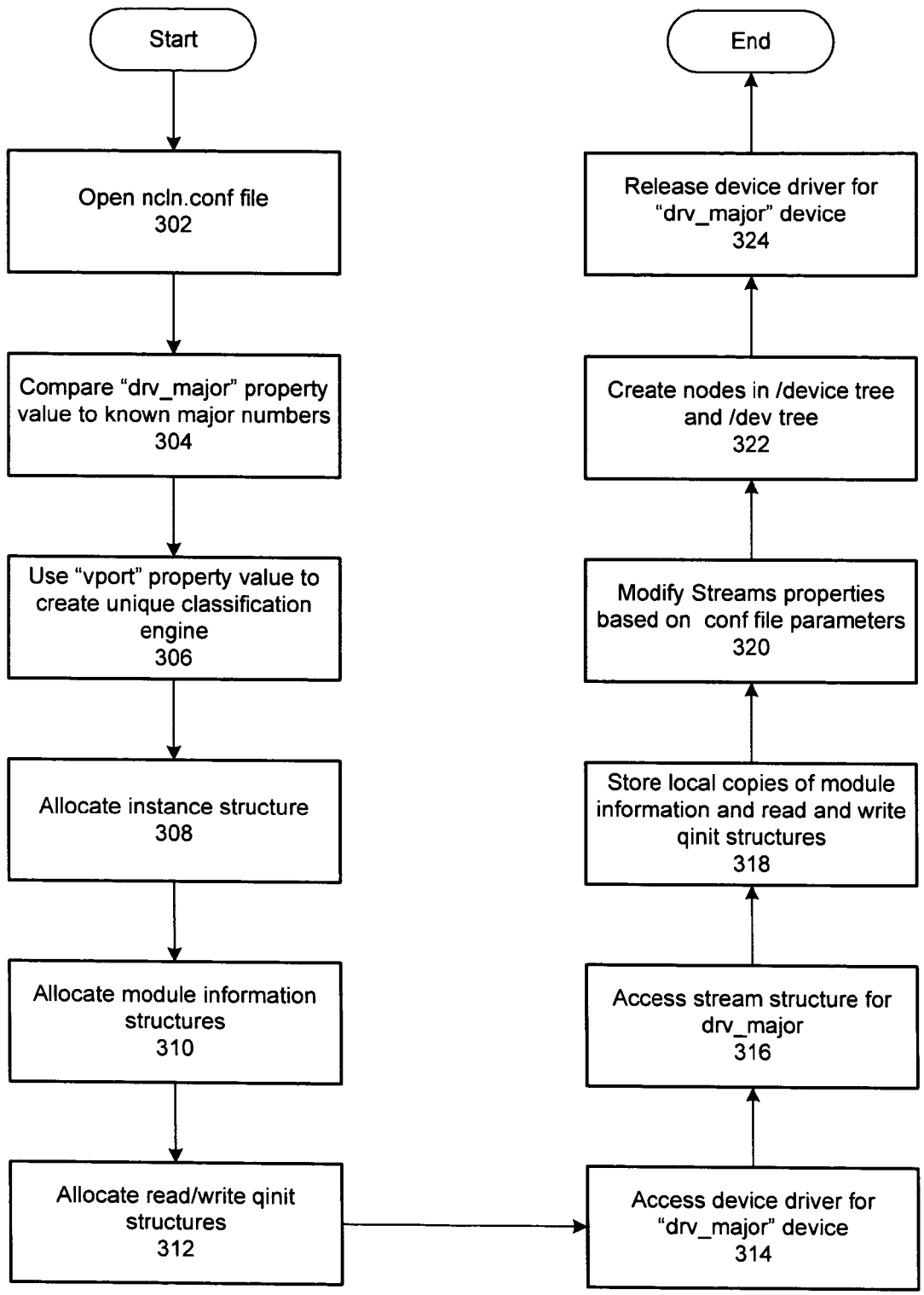
FIG. 3 is a flowchart demonstrating one method of performing a clone driver attach operation, in accordance with an embodiment of the invention.

FIG. 3 demonstrates a method performed by an attach routine for a virtual node, to attach the corresponding device driver, according to one embodiment of the invention. Illustratively, this attach routine may be the routine (e.g., ncln_attach) performed for the ncln driver described above in conjunction with FIG. 2.

In operation 302 the corresponding driver.conf file is read (e.g., ncln.conf), to retrieve the specified properties.

In operation 304, the specified value for the drv_major property is compared to major numbers for known hardware devices (e.g., in a name_to_major file).

In operation 306, the vport property is used to create a unique classification engine, in the driver, for the virtual node.

In operation 308, an instance structure is allocated for the virtual node instance, to store information specific to that instance.

In operation 310, a module information structure is allocated, to allow a copy of the original driver module_info to be made. The new module_info structure will be used for the new virtual node and allow it to be manipulated independently of other virtual nodes.

The module_info structure comprises initial information about the driver for the driver framework to use to set up initial values for a communication stream. The structure is modified to adjust the initial values for streams opened on the virtual node.

In operation 312, read and write qinit structures are allocated. This allows the original driver's qinit structures to be saved for later restoration. As one skilled in the art will recognize, qinit structures are part of the streams framework, and contain stream information such as MTU, high/low watermark, etc. Copies of the structures will be saved, and may be adjusted during a subsequent attachment of the device driver (e.g., using ddi_attach).

In operation 314, the device driver for the hardware device having the drv_major major number is accessed.

In operation 316, the device driver's stream structure is accessed.

In operation 318, local copies of the module information (module_info) structure and the read and write qinit structures are stored (e.g., in the virtual node's instance structure created in operation 308). By creating local copies of the structures, default initial values can be changed when streams are opened.

In operation 320, streams properties compiled into the qinit structures and pointed to by the module_info structure are modified, based on the contents of the driver.conf file. Because only the copies of the structures are modified, the originals are left intact. When streams are opened on the virtual node, the properties in the local structure will be applied, thereby overriding or superseding default properties of the driver that is being virtualized In operation 322 the virtual node's nodes are created in the /devices and /dev trees.

In operation 324, the device driver is released.

In the method of FIG. 3, failure of an operation may cause all previous successful operations to be reversed. A detach routine (e.g., ncln_detach) may also be configured or invoked to reverse successful (or unsuccessful) operations.

Figure 4:
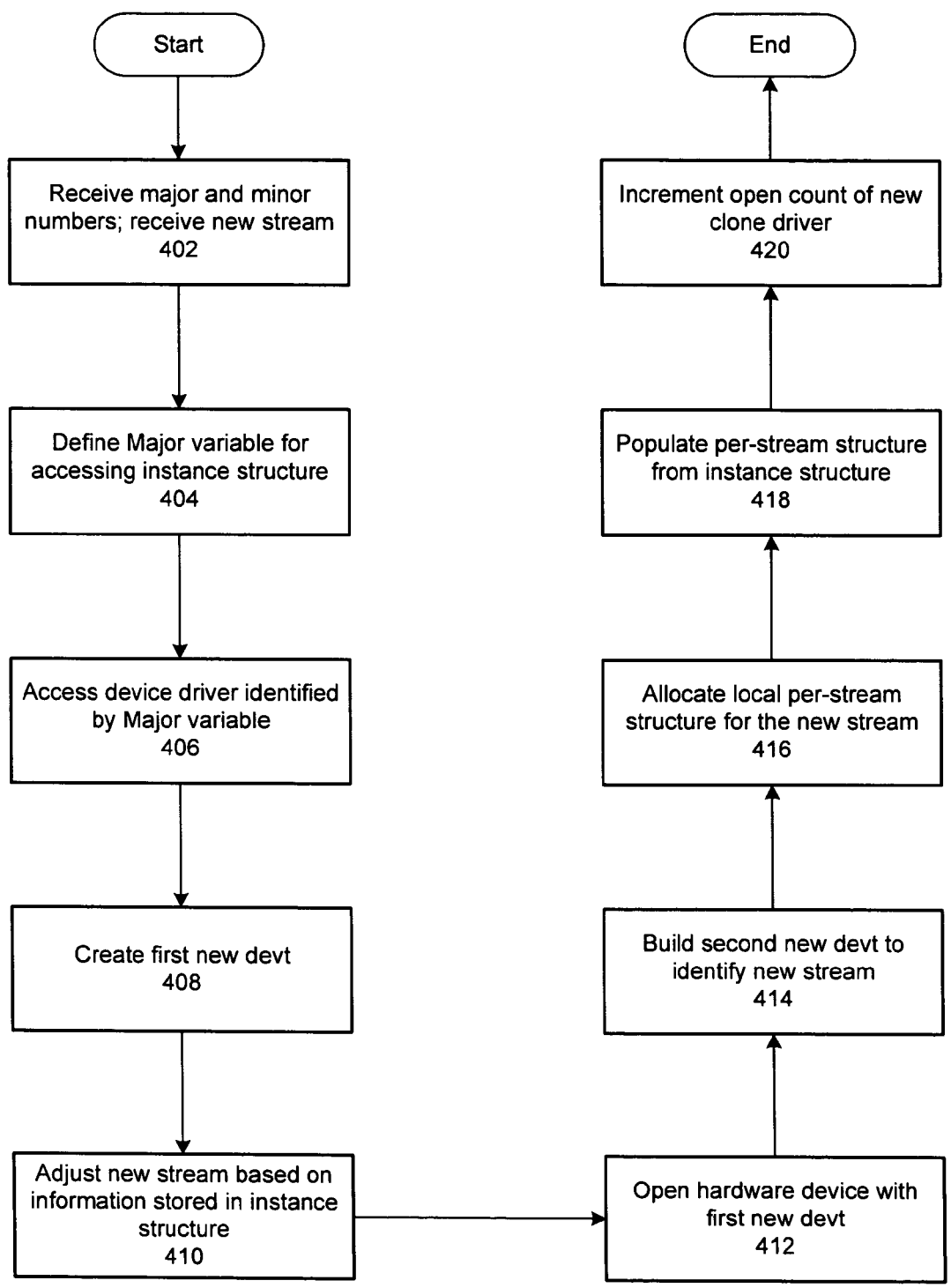
FIG. 4 is a flowchart demonstrating one method of performing a clone driver open operation, in accordance with an embodiment of the invention.

FIG. 4 demonstrates a method of opening a "new clone" device driver (e.g., ncln) to create a new stream for a virtual node, according to one embodiment of the invention. The illustrated embodiment starts with an invocation of the open routine (e.g., ncln_open) on the virtual node's friendly name (e.g., /dev/XXX_v0_p0).

In operation 402, the major and minor numbers associated with the virtual node are received from an incoming devt value, to uniquely identify the node within the /devices directory. In particular, when a file descriptor is used to open the virtual node by friendly name, the file descriptor is mapped to the incoming devt value in the kernel. In addition to the devt value, a new stream queue is also received.

In operation 404, the minor number from the incoming devt is used to define a local "Major" variable, which is used to find the new clone instance structure associated with the virtual node (see operation 308 of FIG. 3). From the instance structure, the drv_major value associated with the first local Major variable is retrieved. That drv_major value identifies the hardware device driver (i.e., the device driver of the hardware that is being virtualized).

In operation 406, the hardware device driver is accessed.

In operation 408, a first new devt value is created to indicate to the device driver how it is being opened (i.e., by the new clone driver, not directly).

In operation 410, streams information for the new streams queue is adjusted, based on local information stored in the instance structure for the virtual node (e.g., the instance structure allocated in operation 308 of FIG. 3). For example, a different MTU size may be applied.

In operation 412, an open routine is invoked on the hardware device driver, using the first new devt value. Illustratively, if the major number returned from the open call does not match the driver's drv_major, the procedure may exit with a failure.

In operation 414, a second new devt value is built to uniquely identify the new stream, which will be bound to the hardware device driver. The second new devt is associated with the new stream queue (received in operation 402) which is associated with the new virtual node.

In operation 416, a local per-stream structure is allocated for the new stream.

In operation 418, the per-stream structure is populated from the new clone instance structure (e.g., high water mark, MTU, read and write pointers to other entry points to the driver).

In operation 420, the open count of the new clone device driver is incremented, to ensure the virtual (clone) node remains resident.

In the method of FIG. 4, failure of an operation may cause all previous successful operations to be reversed. A close (ncln_close) routine may be also configured or invoked to reverse successful operations.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of implementing multiple virtual device nodes within a single operating system instance for a single hardware instance, the method comprising:

in a computer system's devices tree data structure within a single isolated operating system instance, creating a hardware device node for a hardware device of the computer system;

for each of multiple virtualizations of the hardware device, creating an associated pseudo clone node in the devices tree data structure, wherein each pseudo clone node has a major number of a pseudo clone driver and a different minor number, wherein said creating comprises: generating a configuration file for the pseudo clone driver, said configuration file including, for each of the virtualizations: a name of the pseudo clone driver; an instance identifier identifying an associated instance of the pseudo clone driver; a major number of a driver for the hardware device; and a virtual port of the hardware device;

associating a separate communication address with each of the virtualizations; and for each of the virtualizations, configuring a corresponding communication filter in the hardware device to accept communications only for the associated pseudo clone node.

2. The method of claim 1, wherein each pseudo clone node's minor number is generated from a combination of the virtual port and the major number of a driver for the hardware device.

3. The method of claim 1, wherein each pseudo clone node's minor number is generated from a combination of the virtual port, the major number of a driver for the hardware device and an identifier of an instance of the hardware device.

4. The method of claim 1, wherein said creating comprises: invoking an attach routine for the pseudo clone driver.

5. The method of claim 1, wherein said associating comprises:
associating with each of the pseudo clone nodes a different MAC (Medium Access Control) address.

6. The method of claim 1, further comprising: configuring a traffic classifier, wherein said traffic classifier is configured to forward communications accepted by a communication filter to the associated pseudo clone node.

7. A computer readable medium storing instructions that, when executed by a computer, cause the computer to perform a method of implementing multiple virtual device nodes within a single operating system instance for a single hardware instance, the method comprising:
in a computer system's devices tree data structure within a single isolated operating system instance, creating a hardware device node for a hardware device of the computer system;
for each of multiple virtualizations of the hardware device, creating an associated pseudo clone node in the devices tree data structure, wherein each pseudo clone node has a major number of a pseudo clone driver and a different minor number, wherein said creating comprises: generating a configuration file for the pseudo clone driver, said configuration file including, for each of the virtualizations: a name of the pseudo clone driver; an instance identifier identifying an associated instance of the pseudo clone driver; a major number of a driver for the hardware device; and a virtual port of the hardware device;
associating a separate communication address with each of the virtualizations; and
for each of the virtualizations, configuring a corresponding communication filter in the hardware device to accept communications only for the associated pseudo clone node.

8. A computer-implemented method of establishing virtual device nodes for a hardware device, comprising:
detecting a hardware device in a physical computer system operating a single isolated instance of an operating system;
generating a hardware device node for the hardware device in a devices tree data structure of the single operating system instance;
assigning a major number and a minor number to the hardware device node;
opening a configuration file for a clone driver;
based on the configuration file, creating, in a pseudo subtree of the single devices tree structure data structure, multiple virtual nodes corresponding to instances of said clone driver, wherein a first virtual node is configured with a first value for a first communications parameter and a second virtual node is configured with a second value for the first communications parameter, wherein the configuration file comprises, for each said virtual node: an instance identifier configured to identify the corresponding instance of said clone driver; a virtual port identifier configured to identify a virtual port of the hardware device; and a driver major number configured to identify a driver for the hardware device; and
attaching one or more communication streams to each of said multiple virtual nodes, wherein all of the communication streams transit the detected hardware device.

9. The method of claim 8, wherein the configuration file further comprises, for a first virtual node:
an identifier of an instance of the hardware device.

10. The method of claim 8, wherein each said virtual node comprises:
a major number matching a major number of said clone driver; and
a minor number generated from:
a virtual port of the hardware device; and
a major number of a driver for the hardware device.

11. The method of claim 8, wherein each said virtual node comprises:
a major number matching a major number of said clone driver; and
a minor number generated from:
a virtual port of the hardware device;
a major number of a driver for the hardware device; and
a minor number of the driver for the hardware device.

12. The method of claim 8, wherein said first property is maximum transfer unit (MTU) size, the method further comprising:
operating communication streams attached to said first virtual node with an MTU size according to said first value; and
operating communication streams attached to said second virtual node with an MTU size according to said second value.

13. The method of claim 8, further comprising:
assigning each of the multiple virtual nodes a separate communication address; and
associating a separate filter with each of the multiple virtual nodes.

14. The method of claim 13, wherein:
a first filter associated with said first virtual node is configured to drop communications exceeding said first value for said first property; and
a second filter associated with said second virtual node is configured to drop communications exceeding said second value for said first property.

15. A computer readable medium storing instructions that, when executed by a computer, cause the computer to perform a method of establishing virtual device nodes for a hardware device, comprising:
detecting a hardware device in a physical computer system operating a single isolated instance of an operating system;
generating a hardware device node for the hardware device in a devices tree data structure of the single operating system instance;
assigning a major number and a minor number to the hardware device node;
opening a configuration file for a clone driver;
based on the configuration file, creating, in a pseudo subtree of the single devices tree data structure, multiple virtual nodes corresponding to instances of said clone driver, wherein a first virtual node is configured with a first value for a first communications parameter and a second virtual node is configured with a second value for the first communications parameter, wherein the configuration file comprises, for each said virtual node: an instance identifier configured to identify the corresponding instance of said clone driver; a virtual port identifier configured to identify a virtual port of the hardware device; and a driver major number configured to identify a driver for the hardware device; and
attaching one or more communication streams to each of said multiple virtual nodes, wherein all of the communication streams transit the detected hardware device.

16. A computer-implemented method of virtualizing an instance of a hardware device, the method comprising:
in a single, isolated operating system executing on a computer system comprising the instance of the hardware device, reading a configuration file associated with a clone driver;
for each of multiple instances of the clone driver defined in the configuration file for operation within the single operating system:
invoking an attach routine corresponding to the clone driver;
creating a corresponding virtual node in a pseudo sub-tree of the computer system's devices tree data structure, each said virtual node having at least one operating property different from other virtual nodes;
assigning said corresponding virtual node a major number matching a major number of the clone driver, wherein the major number identifies the clone driver as a driver for the hardware device;
assigning said corresponding virtual node a minor number unique to said virtual node;
creating a friendly name for said virtual node in the computer system's devices tree data structure; and
opening said corresponding virtual node; and
attaching one or more communication streams to each said virtual node.

17. The method of claim 16, further comprising:
associating with each of said virtual nodes a different communication address.

18. The method of claim 17, further comprising:
associating with each of said virtual nodes a separate communication filter;
wherein said filter is configured to reject communications not having the communication address associated with said virtual node.

19. The method of claim 18, wherein each said filter is also configured to reject a communication having the communication address associated with said virtual node if said communication conflicts with an operating property of said virtual node.

20. The method of claim 19, wherein said operating property is MTU (Maximum Transfer Unit) size.

21. A computer readable medium storing instructions that, when executed by a computer, cause the computer to perform a method of virtualizing an instance of a hardware device, the method comprising:
in a single, isolated operating system executing on a computer system comprising the instance of the hardware device, reading a configuration file associated with a clone driver;
for each of multiple instances of the clone driver defined in the configuration file for operation within the single operating system:
invoking an attach routine corresponding to the clone driver;
creating a corresponding virtual node in a pseudo sub-tree of the computer system's devices tree data structure, each said virtual node having at least one operating property different from other virtual nodes;
assigning said corresponding virtual node a major number matching a major number of the clone driver, wherein the major number identifies the clone driver as a driver for the hardware device;
assigning said corresponding virtual node a minor number unique to said virtual node;
creating a friendly name for said virtual node in the computer system's devices tree data structure; and
opening said corresponding virtual node; and
attaching one or more communication streams to each said virtual node.

22. An apparatus for virtualizing a hardware device within an isolated instance of an operating system operating on a computer system comprising the hardware device, the apparatus comprising:
a hardware device configured to receive communications;
a driver for the hardware device;
a clone driver;
a configuration file for said clone driver, said configuration file defining multiple virtual device nodes to be created for the hardware device; and
a single devices tree data structure maintained by the operating system, comprising:
a hardware device node corresponding to the hardware device; and in a pseudo sub-tree, for each said virtual device node, a clone node corresponding to the clone driver and the hardware device, wherein each said clone node comprises: a major number matching a major number of the clone driver, wherein the major number identifies the clone; and a minor number distinguishing said clone node from said other clone nodes.

23. The apparatus of claim 22, wherein each said virtual device node comprises:
an instance identifier configured to distinguish said virtual device node from other said virtual device nodes; and
a virtual port identifier configured to identify a virtual port of the hardware device.

24. The apparatus of claim 22, wherein the hardware device comprises multiple communication filters, wherein:
each said filter is associated with a separate one of said clone nodes; and
each said filter rejects communications not addressed to said associated clone node.

25. The apparatus of claim 24, wherein each said filter also rejects communications addressed to said clone node that do not meet an operating property of said associated clone node.

26. The apparatus of claim 25, wherein said operating property is MTU (Maximum Transfer Unit) size.

27. The apparatus of claim 24, further comprising:
a traffic classifier configured to forward to a clone node communications accepted by said associated communication filter.

28. The apparatus of claim 22, wherein each said clone node is assigned a separate communication address.

29. The apparatus of claim 28, wherein said communication address is a MAC (Medium Access Control) address.

* * * * *

UNITED STATES PATENT AND TRADEMARK OFFICE
CERTIFICATE OF CORRECTION

PATENT NO. : 7,689,723 B1  Page 1 of 1
APPLICATION NO. : 10/983442
DATED : March 30, 2010
INVENTOR(S) : Francesco DiMambro It is certified that error appears in the above-identified patent and that said Letters Patent is hereby corrected as shown below:

In claim 8 (at column 9, line 61), please replace the word "for" with the word --of-- so that the line reads: "to identify a driver of the hardware device; and".

Signed and Sealed this

First Day of June, 2010

David J. Kappos
*Director of the United States Patent and Trademark Office*